Sept. 27, 1927.　　　　　　　　　　　　　　　1,643,718
G. LOECK
DEVICE FOR EXAMINING TUBES AND CAVITIES IN THE BODY
Filed April 14, 1926
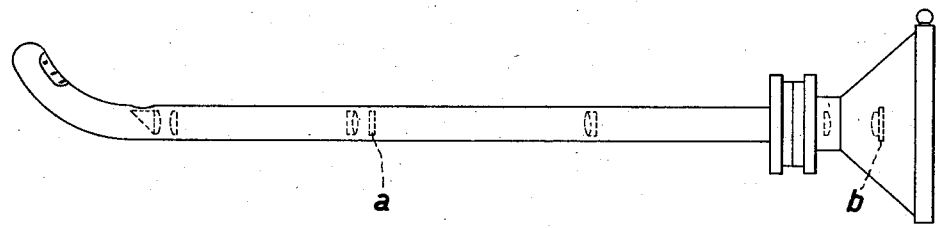
Inventor:

Patented Sept. 27, 1927.

1,643,718

UNITED STATES PATENT OFFICE.

GÜNTHER LOECK, OF BERLIN, GERMANY, ASSIGNOR TO THE FIRM OF GEORG WOLF G. M. B. H., OF BERLIN, GERMANY.

DEVICE FOR EXAMINING TUBES AND CAVITIES IN THE BODY.

Application filed April 14, 1926, Serial No. 102,044, and in Germany April 11, 1925.

When examining tubes and cavities in the body, e. g. the urinary organs or the stomach it is sometimes of the utmost importance that also differences in color may be exactly recognized in order to be able to ascertain, for instance, slight inflammations or, on examining blood vessels, to be in a position to distinguish the veins from the somewhat redder arteries.

It has now been proved and in this consists the present invention that also particularly minute differences in the color of the walls of the tubes and cavities will be still recognizable by introducing into the path of rays of the corresponding apparatus, viz the cystoscopes, gastroscopes and so forth a plurality of light filters (viz at least two of them) of different tint. It is thereby possible to yet recognize differences in color which could not be recognized any more with the use of a single filter. One of these filters may, e. g. be formed by the correspondingly tinted wall of the glow lamp used for the illumination and another by a filter-disc inserted into the path of rays of the imaging optical system. However, it seems to be more suitable, e. g. on account of the easier manufacture of the filter-discs to renounce a coloring of the illuminating pencil of rays and to insert all filters into the path of rays of the imaging optical system.

The annexed drawing shows a front view of a cystoscope according to the present invention, which is provided with two filters, i. e. a light yellow one $a$ and a light blue one $b$, both located in the path of rays of the imaging system.

I claim:

Device for examining tubes and cavities in the body, containing a tube, a source of light fitted in the tube at the end of the same, to be introduced into the said body and adapted to illuminate the spot to be examined, an optical system, admitting of observing the spot to be examined, and a plurality of light filters of different tint, located in the path of rays.

GÜNTHER LOECK.